United States Patent [19]

Illuzzi et al.

[11] Patent Number: 4,642,550
[45] Date of Patent: Feb. 10, 1987

[54] SELF-OSCILLATING SWITCHING REGULATOR HAVING REAL-TIME CURRENT ADJUSTMENT CONTROL

[75] Inventors: Vincent A. Illuzzi, Staten Island, N.Y.; Walter G. Kutzavitch, Freehold; Allen J. Rooney, III, Madison, both of N.J.

[73] Assignees: American Telephone and Telegraph Company; AT&T Information Systems, Inc., both of Morristown, N.J.

[21] Appl. No.: 712,637

[22] Filed: Mar. 18, 1985

[51] Int. Cl.[4] .............................................. G05F 1/60
[52] U.S. Cl. ..................................... 323/222; 323/285
[58] Field of Search .................. 363/21; 323/222, 284, 323/285, 286, 287, 299

[56] References Cited

U.S. PATENT DOCUMENTS

| 3,675,158 | 7/1972 | Judd et al. | 331/109 |
| 3,675,159 | 7/1972 | Judd et al. | 331/109 |
| 3,743,916 | 7/1973 | Welschedel et al. | 321/2 |
| 3,974,439 | 8/1976 | Holland | 323/222 |
| 4,456,872 | 6/1984 | Froeschle | 363/21 |

Primary Examiner—Peter S. Wong
Assistant Examiner—Judson H. Jones
Attorney, Agent, or Firm—John A. Caccuro

[57] ABSTRACT

A self-oscillating switching regulator includes an inductor which is switched across the input or output depending, respectively, on whether a control voltage does not or does exceed a predetermined threshold. The control voltage is generated from a predetermined sum of the output voltage and a voltage dependent upon the inductor current when the inductor is connected across the input.

5 Claims, 4 Drawing Figures

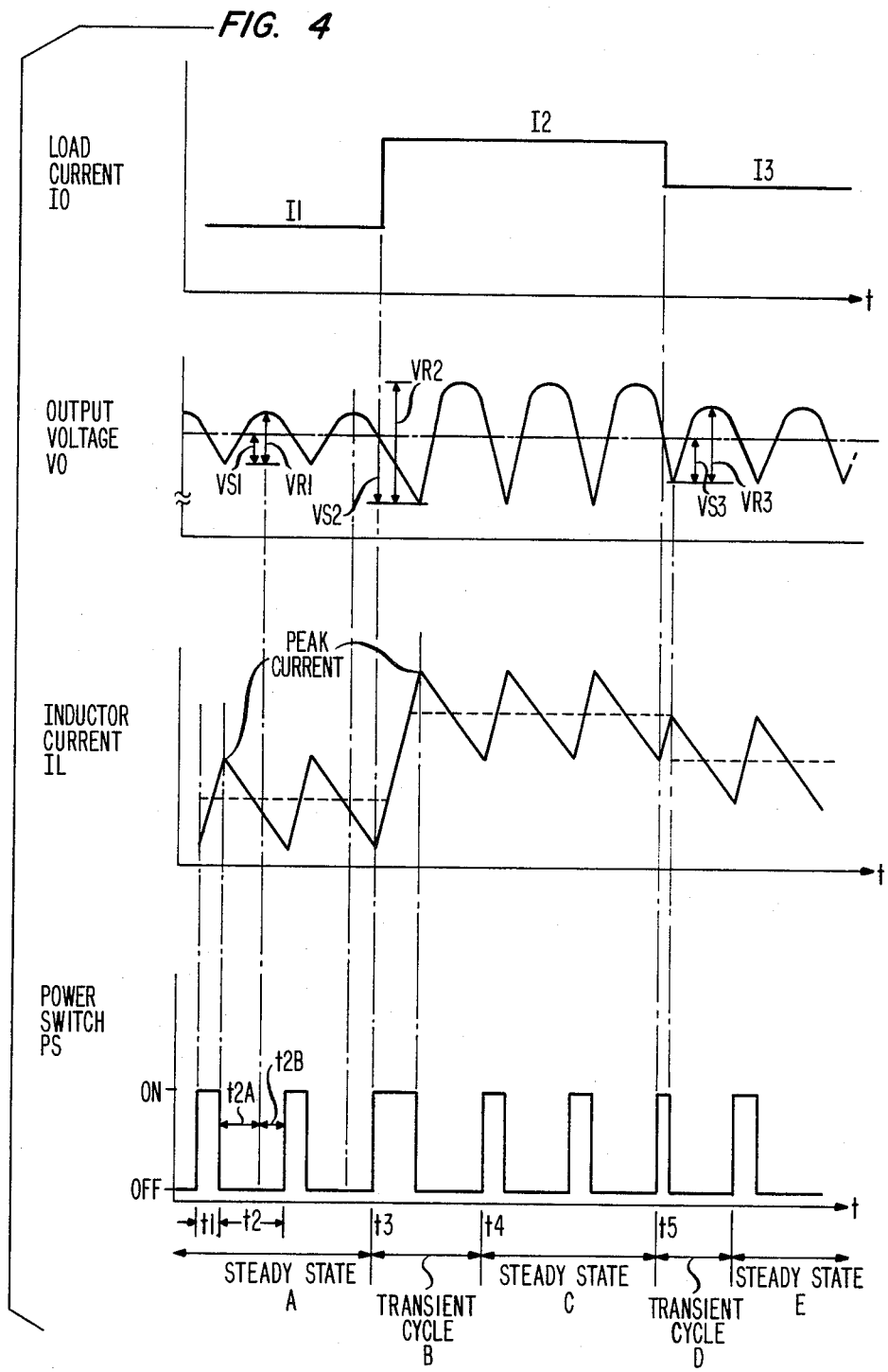

4,642,550

SELF-OSCILLATING SWITCHING REGULATOR HAVING REAL-TIME CURRENT ADJUSTMENT CONTROL

FIELD OF THE INVENTION

This invention relates to self-oscillating switching voltage regulators and more particularly to a control circuit which makes real-time adjustments to the switching regulator current in response to load current changes.

BACKGROUND OF THE INVENTION

Some prior art switching regulators utilize fixed frequency variable pulse width modulation techniques to control the current supplied to a load. While operation of the switching regulator at a fixed frequency simplifies the design of filters utilized with the power supply, maintaining the frequency constant typically makes for a more expensive switching regulator. Moreover, because of the fixed frequency mode of operation, switching regulator current adjustments can occur only at prescribed time intervals which usually do not coincide with load current transients. Consequently, a fixed frequency switching regulator has a slower response time to load current changes. What is desirable is a low cost efficient switching regulator having improved load current response time.

SUMMARY OF THE INVENTION

According to the present invention, the inductor which transfers current between the input and output of the disclosed switching regulator is not operated at a fixed frequency or at a fixed pulse width. But rather, the period of time that the inductor is switched across the input is dependent upon both the current flow through the inductor and the output voltage. More specifically, the inductor is charged across the input as long as the sum of a predetermined fraction of the output voltage plus the voltage developed by the inductor charging current is less than a predetermined threshold. When the threshold is exceeded, the inductor is switched across the output and discharges its current into an output capacitor and the connected load. According to the present invention, a timer circuit prevents a control circuit from switching the inductor back across the input for a predetermined time period. Because the magnitude of inductor current is contemporaneously adjusted to compensate for changes in the output voltage, the result is a switching regulator having improved load current transient response time.

BRIEF DESCRIPTION OF THE DRAWINGS

The characteristics and operation of the present invention will be more apparent from the following detailed description taken, in conjunction with the drawing in which:

FIG. 4 is a series of waveforms which illustrate the effect of changes in the load current on the power switch operating cycle, inductor current and output voltage.

DETAILED DESCRIPTION

Figure 1:
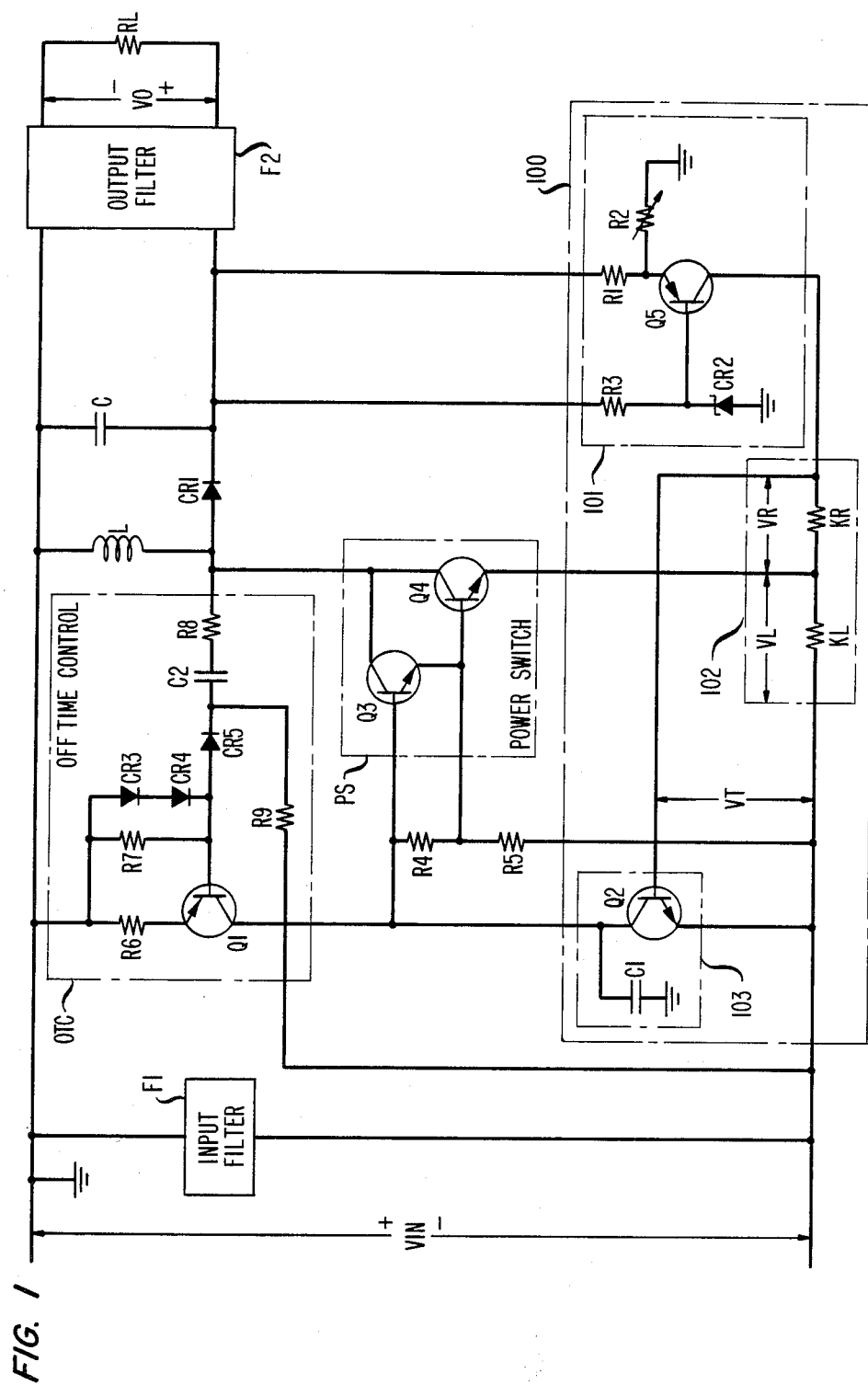
FIG. 1 is a schematic diagram of a switching regulator including the present invention.

Shown in FIG. 1 is an illustrative schematic of a self-oscillating switching regulator according to the present invention. The regulator operates as an inverting buck/boost converter with peak current control. Input voltage VIN is inverted and converted to a lower output voltage V0 by the regulator of FIG. 1. Filters F1 and F2 provide filtering, respectively, across the input and output terminals. Power switch PS (darlington pair Q3, Q4) switches inductor L across the input under control of control circuit 100. Control circuit 100 includes a voltage amplifier 101, control voltage circuit 102 and voltage controlled switch 103. When the power switch PS is ON, the inductor current builds up and when power switch PS is OFF the inductor current flows through commutating diode CR1 to capacitor C and load RL. The basic regulator operation of periodically operating the power switch to cause inductor L to charge and then dump current through diode CR1, capacitor C and load RL under control of control circuit 100 is well known. The present invention utilizes a novel control circuit for control of the operation of the regulator.

Transistor Q5 of voltage amplifier 101 has the base biased at a predetermined voltage (less than the output voltage V0) by Zener CR2 and resistor R3. Resistors R1 and R2 bias the emitter of transistor Q5. Transistor Q5 provides voltage gain for the switching regulator. The gain is determined by the ratio of resistor KR to resistor R1.

Control voltage circuit or summer circuit 102 includes resistors KR and KL which provide a way to sum the voltage VL derived from inductor L current, via power switch PS, and voltage VR derived from output voltage V0. The sum of these voltages $VT = VR + VL$ is then applied across the base-emitter junction of transistor Q2. When VT exceeds the turn-on threshold VBE-ON of transistor Q2, transistor Q2 turns-on and provides a short across resistors R4 and R5 thereby turning-off power switch PS. When VT is less than VBE-ON transistor Q2 is turned-off and resistors R4 and R5 operate under control of Off Time Control (OTC) circuit. The OTC circuit biases power switch PS on or off. Capacitor C1 provides high frequency gain roll-off to prevent erratic operation caused by unwanted high frequency oscillation in control circuit 100.

The operation of the OTC circuit will now be described. Resistor R7, diode CR5 and resistor R9 form a voltage divider which turns-on transistor Q1 whenever capacitor C2 is discharged. Diodes CR3 and CR4 limit the base bias of Q1 to about −1.4 volts. While Q1 is conducting, the power switch PS may be turned-on. Resistors R4 and R5 provide proper bias voltages for Q3 and Q4 of power switch PS. When the power switch PS turns-on, capacitor C2 charges quickly toward the negative supply voltage through resistor R8. At the same time the current through inductor L increases or ramps up. This current generates a voltage VL across resistor KL which adds to voltage VR generated across resistor KR by transistor Q5. When this voltage $VT = VR + VL$ exceeds VBE-ON of transistor Q2, Q2 conducts, shunting resistor R4 and R5 which turns-off the power switch PS.

Resistor R6 limits the current through transistors Q1 and Q2 when both transistors are on simultaneously. When power switch PS turns-off, the polarity of L reverses forcing current through diode CR1. Due to the charge stored on capacitor C2, this polarity reversal drives the cathode of diode CR5 positive with respect to ground, cutting off the base drive to transistor Q1. Diode CR5 blocks the base of transistor Q1 from excessive reverse bias voltages and prevents capacitor C2 from discharging through resistor R7. At this time, the four transistors, Q1, Q2, Q3 and Q4 are off. They remain off until capacitor C2 discharges sufficiently through resistor R9 to forward bias diode CR5, initiating the start of a new cycle.

Figure 2:
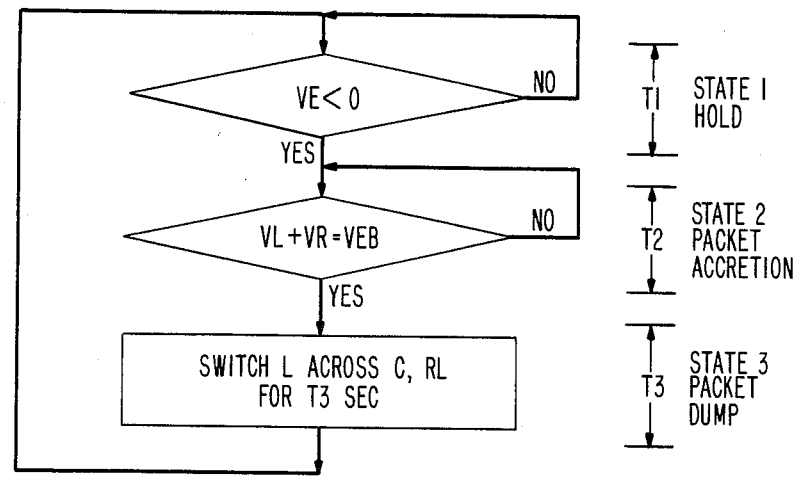
FIG. 2 is a flow chart describing the operating steps of the present invention.
Figure 3:
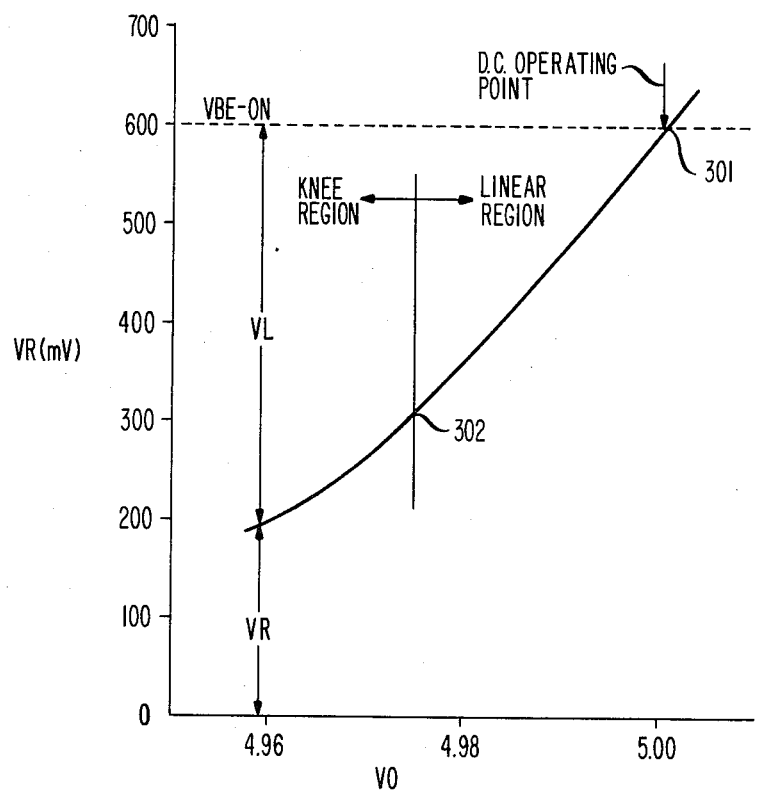
FIG. 3 is a graph which relates the voltage amplifier voltage VR to the output voltage V0.

With joint reference to FIGS. 1, 2 and 3, the general operation of the present regulator is described. The regulator sustains the desired output voltage V0 by maintaining a balance between the energy added to the inductor L and the energy required by the load RL. This is accomplished by controlling the peak current through the inductor. The magnitude of the inductor current IL at the instant the power switch PS is turned-off determines the amount of energy stored in the inductor L and subsequently transferred to the load RL. Power switch PS is turned-off when the voltage VT reaches the VBE-ON threshold of Q2. As noted earlier, VT is the sum of the voltage VR+VL. The voltage VR in FIG. 3, generated by the regulator, is an inverse measure of the energy consumed by load RL. Thus, the regulator generates a voltage, VR, which is a portion of the voltage necessary to trigger-off the power switch. The remainder of this trigger voltage, VL, must be generated by the inductor current. VR varies inversely with the energy consumed by the load in such a way that the magnitude of VL necessary to cause VT to reach the threshold voltage VBE-ON occurs when the inductor energy is sufficient to meet the load requirements.

With reference to FIG. 2, the regulator operates as a periodicity T equal to T1+T2+T3. Where T1 is the Hold state, where the regulator is waiting for the output voltage V0 to sag below a voltage which causes voltage VR to drop and consequently causes VT to momentarily fall below VBE-ON. This generates a negative voltage error VE=VBE-ON−VT which causes the regulator to charge the inductor L during the Packet Accretion state. The inductor L is charged with a packet of energy for T2 seconds, the time it takes voltage VL to restore VT=VBE-ON and hence eliminate the negative voltage error VE. At this time the regulator switches to the Packet Dump state for a fixed period of time T3. T3 is fixed (by OTC circuit shown in FIG. 1) to assure that all of the energy added to inductor L has been transferred to capacitor C and load RL. After this fixed period of time the regulator returns to the Hold state where the regulator waits for the negative error to again appear after which the Packet Accretion state would again be entered.

During Packet Accretion, state 2, while the inductor L is being "recharged", the output voltage V0 to the load RL is sustained by output capacitor C. This energy drain causes the voltage V0 across the capacitor C to sag in proportion to the load RL. This sag voltage results in a decrease in VR which is used by the regulator to determine in real time how much energy to add to the inductor L. Under a light load, the sag voltage, and hence the decrease in VR, is small and thus the additional inductor current needed to raise VL to offset the decrease in VR is small. Thus, VT reaches the trigger threshold VBE-ON at a low value of inductor current (since only a small change in VL is needed). When the output load current I0 is heavy the capacitor voltage sags further which requires a larger increase in VL to offset the larger decrease in VR. The inductor current IL must then climb to a higher value, since the change in VL is larger, before power switch PS is turned-off.

The adjustments in the size of the energy replacement packets occur in real time on a cycle by cycle basis. That is, the energy added to inductor L during the Accretion state of a given cycle is equal to the energy used by the load during the same cycle. This is due to the Hold state which prevents the next cycle from starting until all the energy from the previous cycle is consumed.

FIG. 4 illustrates the Packet Accretion state and the Packet Dump and Hold states of operation. During time A the load current from the regulator I0 =I1 is constant and the regulator is operating in a steady-state mode. In this steady-state condition the output voltage sag is VS1. The energy being stored in the inductor during Packet Accretion time t1 matches the energy used by the load during the cycle t1+t2.

During the Packet Dump time t2A inductor L transfers energy to capacitor C and the load RL causing the output voltage V0 to rise. During the Hold time, t2B, the inductor L energy is not sufficient to sustain the load RL alone. The capacitor C is also transferring energy to the load causing the output voltage V0 decreases. Since the Packet Dump state is fixed, as determined by the OTC circuit, at high load currents the output voltage V0 may begin to decrease prior to the end of the Packet Dump state.

At time B the load current suddenly increases to I2 causing capacitor C voltage to sag further VS2. In order for the inductor L to supply the extra current I2−I1 demanded by the load, its peak current must be increased. The regulator accomplishes this by extending the turn-on time t3 of the power switch causing the occurrence of a transient cycle. Once the inductor peak current is sufficiently raised the regulator once again operates steady-state time C, but the increased load current I2 causes the capacitor C voltage to continue to sag to approximately the VS2 level. Note, the sag voltage is dependent on load current I0. The peak inductor current remains at the higher level as long as I0=I2. In the steady-state condition the turn-on time of power switch PS t4 is not necessarily equal to t1.

At time D the regulator enters another transient cycle. In this case since the inductor energy is higher than the load requires, the turn-on time of power switch PS is decreased to t5. At time E the regulator once again operates at a steady-state at the load current I3.

With reference to FIG. 3, the slope of VR vs. V0 is primarily determined by the inductor L current and output ripple voltage VR1. Resistor KL is the inductor L current multiplication factor which converts inductor current to voltage VL. The size of resistor KL and the inductor current determine how large VL is and what part of VT it represents. KL must be small enough to allow the inductor current to reach a peak value which enables the regulator to attain its maximum load current rating. Obviously, the inductor L, power switch PS, and other components should be selected to handle this peak current value.

During the switching regulator start-up when V0 and hence VR equals 0 volts, istor KL must be capable of shutting down the power switch (i.e., VL=VBE-ON) before the inductor current reaches a destructive level. The voltage VL increases linearly with inductor current. The difference between the trigger threshold VT=VBE-ON and VL is the voltage VR which must be generated by voltage amplifier 101.

The gain required by voltage amplifier 101 must be such that the change in sag voltage caused by a change in load current results in an appropriate change in voltage VR which would force the inductor current to operate at the new load current. The change in the sag voltage is readily determined from the size of capacitor and the anticipated changes in load current. Note that the voltage drop across the equivalent series resistance of capacitor C, although small, also adds to the voltage sag.

The changes in inductor current required to produce an anticipated load current change is readily determined. The change in VL is determined by the change in inductor current multiplied by resistor KL. This change in VL is then equal to negative of the change in VR (since VT=VR+VL and VT=VBE-ON which is a constant). The voltage gain of amplifier 101 is then the change in VR divided by the change in sag voltage. As noted previously, the gain of the voltage amplifier is essentially determined by the ratio of resistor KR divided by resistor Rl.

With reference to FIG. 3, the output voltage V0 is the dc operating point 301 which is where the regulator is most stable and hence the regulator always attempts to operate thereabout. The dc operating point is the value of Zener diode CR2 plus VBE-ON of Q5 times the ratio of R2+Rl over R2. The output voltage V0 is primarily determined by the value of CR2.

Since the regulator is a self-oscillating type and since the Packet Dump period is fixed, the Hold state and Packet Accretion states vary depending on load current. The regulator adjusts the state times to assure that the change in capacitor C energy averaged over one full switching period T is zero. While not essential to the operation of the present invention, keeping the Packet Dump state fixed limits the maximum self-oscillating frequency of the regulator.

The discontinuity or knee shown at 302 of FIG. 3 is a result of non-linear gain of voltage amplifier transistor Q5. This occurs because transistor Q5 emitter-base junction starts to turn-off. The location of the knee is primarily controlled by the selection of Rl and R2. The non-linearity in the gain of transistor Q5 plays a useful role by controlling the regulator's response to a sudden large load current increase. In the event of such a load current change, the output voltage sag may drop well below the steady-state operating range, causing the regulator to increase the Packet Accretion time. During this increased time interval, the output voltage V0 is constantly dropping since the load is being supplied by capacitor C. If the transistor's gain were linear below the steady-state range, it would attempt in one cycle to increase the inductor current to compensate for the load current change. This would cause an excessive increase in the Packet Accretion time and consequently an excessive sag in the output voltage. Placing the knee as shown in FIG. 3 reduces the regulator gain below the steady-state region and causes compensation for large load current increases to occur more slowly over 2 or 3 cycles, effectively softening the supply's transient response.

While the present invention uses bipolar transistors, it is contemplated that other types of semiconductor devices could be utilized for the implementation. Moreover, while the present invention uses discrete components it is contemplated that an integrated circuit or a hybrid integrated circuit could be utilized for part or all of the implementation. Hence, what has been described is merely illustrative of the application of the principles of the present invention. Other methods and circuits can be implemented by those skilled in the art without departing from the spirit and scope of the present invention.

What is claimed is:

1. A self-oscillating switching voltage regulator comprising
   an input,
   an output,
   an inductor,
   a control circuit for switching said inductor across said input when a control voltage does not exceed a predetermined threshold voltage and for switching said inductor across said output when said control voltage exceeds said predetermined threshold voltage,
   a control voltage circuit for generating said control voltage by summing a prdetermined percentage of an output voltage to a voltage dependent on the magnitude of inductor current when said inductor is connected across said input, said control voltage circuit including
   a resistor serially connected to a switching device which together are serially connected to said inductor, said resistor generating said inductor current dependent voltage,
   a second resistor having one end connected to an output voltage amplifier and a second end connected in series with said resistor at the connection of said resistor to said switching device, said voltage amplifier generating said predetermined percentage of said putput voltage across said series connection of said resistor and said second resistor, and
   wherein said control voltage is generated across said series connection of said resistor and said second resistor.

2. The switching regulator of claim 1 wherein said voltage amplifier includes
   a transistor amplifier having an input connected across the regulator output and an output connected across said series connection of said second resistor and said resistor.

3. The switching voltage regulator of claim 1 wherein said voltage amplifier includes a limiting circuit for reducing the gain of said voltage amplifier when the output voltage decreases beyond a predetermined voltage level.

4. The switching regulator circuit of claim 1 wherein the output voltage is primarily determined from a Zener diode located in said voltage amplifier.

5. The switching voltage regulator of claim 1 wherein said control circuit includes a transistor operated as a voltage controlled switch which utilizes the base-to-emitter junction voltage as said predetermined threshold voltage.

* * * * *